March 29, 1932.  W. DIETER  1,851,816
DEPTH ENGINE FOR AUTOMOBILE TORPEDOES
Original Filed Jan. 2, 1926   2 Sheets-Sheet 1
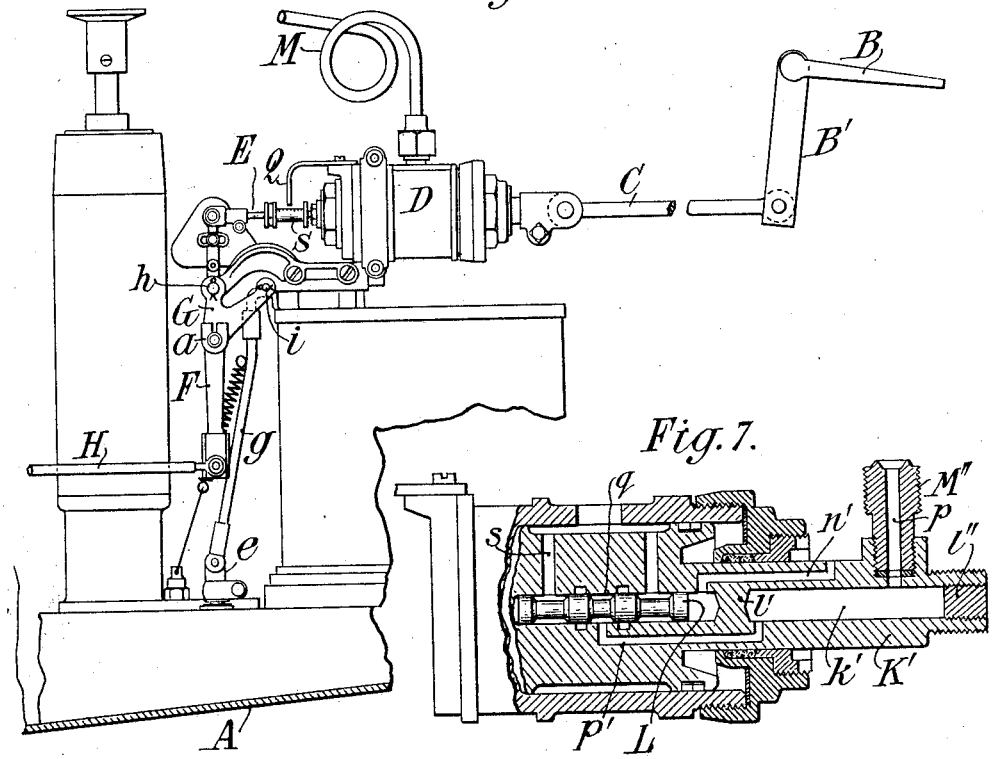
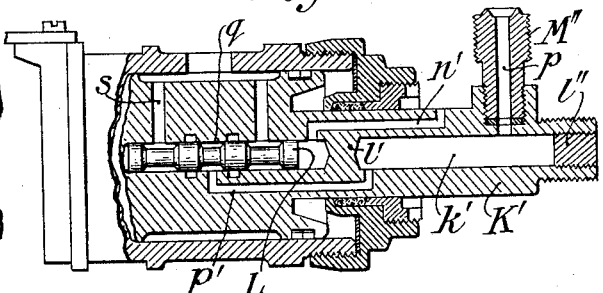
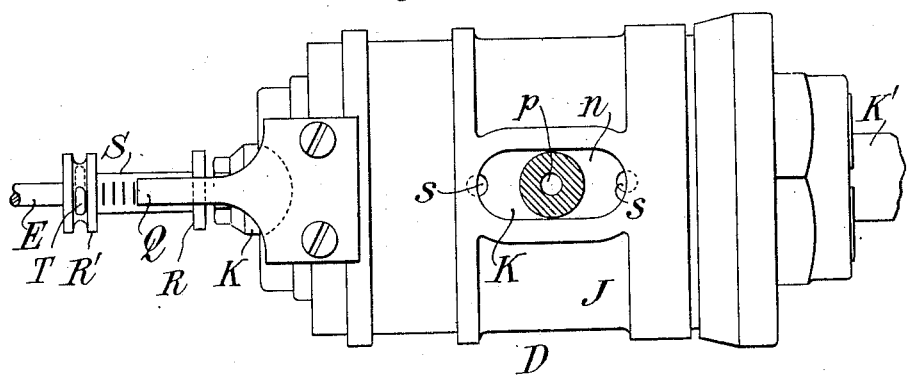
INVENTOR
William Dieter,
By Attorneys,
Fraser, Myers & Manley

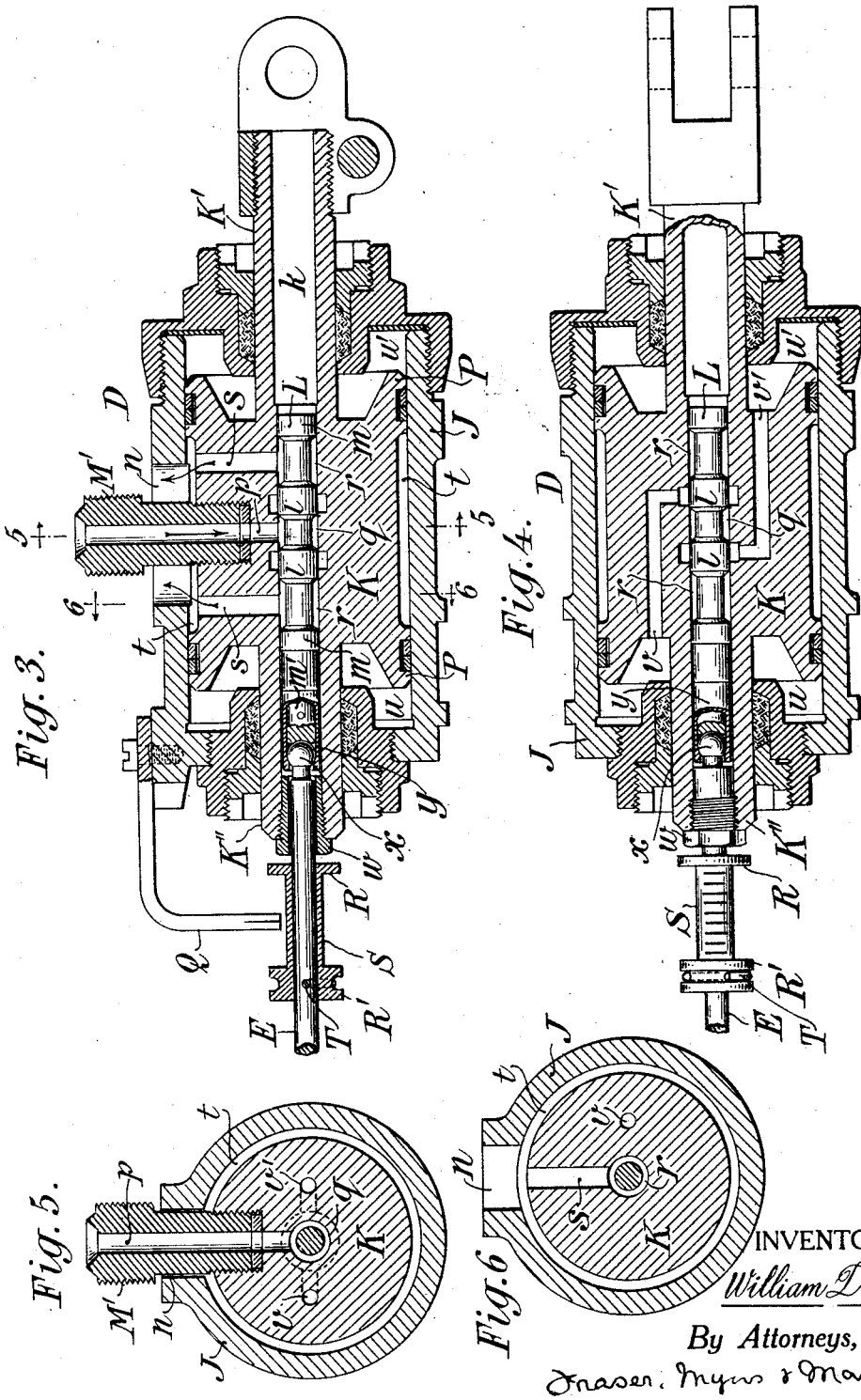

Patented Mar. 29, 1932

1,851,816

UNITED STATES PATENT OFFICE

WILLIAM DIETER, OF NEWARK, NEW JERSEY, ASSIGNOR TO E. W. BLISS COMPANY, OF BROOKLYN, NEW YORK, A CORPORATION OF DELAWARE

DEPTH ENGINE FOR AUTOMOBILE TORPEDOES

Continuation of application Serial No. 78,825, filed January 2, 1926. This application filed December 31, 1927. Serial No. 244,034.

This invention relates to the so-called depth engine used as a part of the diving gear or immersion mechanism of automobile torpedoes.

In the Bliss-Leavitt torpedo the depth engine is connected and operated in the manner generally set forth in my Patent No. 1,190,871, dated July 11, 1916.

Engines of this character operate on the follow-up principle; that is to say, the piston or plunger follows every movement of the valve. The valve is connected through suitable connecting mechanism to a hydrostatic diaphragm responding to the immersion pressure on the one hand, and to a pendulum swinging in a fore and aft plane, on the other. These connections are clearly shown in my said patent. Such engine requires that its controlling valve shall be delicately balanced and extremely sensitive in operation.

The object of the present invention is to improve and simplify the construction of the engine to make it more reliable and improve its lubrication.

Figure 1 of the accompanying drawings is a side elevation of a part of the depth gear, including the depth engine, and showing its connections. The remaining figures are on a larger scale.

Fig. 2 is a plan of the engine.

Fig. 3 is a vertical longitudinal section thereof.

Fig. 4 is a horizontal longitudinal section thereof.

Fig. 5 is a transverse mid-section on the line 5—5 in Fig. 3.

Fig. 6 is a transverse section on the line 6—6 in Fig. 3.

Fig. 7 is an elevation of the engine, partly in section, in the same plane as Fig. 3, showing a modified construction.

Referring to Figure 1, A represents a part of the hull of the torpedo, B the depth rudder connected by the lever B' (corresponding to a tiller) and by a rod C to the plunger of the depth engine D. The valve of this engine is operated by a valve rod E from a lever F pivoted at $a$ and connected by a rod H to the pendulum (not shown); another lever G is pivoted at $h$ to a fixed point, carries at $a$ the central pivot of the lever F, and has an arm pivoted at $i$ to a link $g$ which is pivoted to the plunger rod $e$ of the hydrostat. The latter is not shown in detail, but its construction may be the same as in my said patent. The mechanical connections shown in Fig. 1 are similar in their operation to those shown in my said patent, and are a well-understood part of the Bliss-Leavitt torpedo.

In the ordinary construction of depth engine as standard in the Bliss-Leavitt type of torpedo, the cylinder has within it a plunger the central stem of which emerges at both ends through stuffing boxes, its aft end being connected to the rudder rod C; this plunger stem is bored through longitudinally and forms a chamber for the pilot valve which is connected to the valve rod E. The plunger is ported, so that the air under pressure is admitted to the middle of the valve, and through the valve to either end of the plunger, and from the plunger ends through the valve to the exhaust. This requires, as heretofore constructed, a plunger consisting of three or four piston portions each with its own packing rings, and a valve having air passages between piston portions, whereby to distribute the flow.

The present invention simplifies the internal construction of the depth engine, as will be explained.

Referring principally to Figs. 3 to 6 of the drawings, J is the engine cylinder, K is the plunger, and L the valve. The plunger is reduced at opposite ends to form tubular necks K', K'', as usual, these passing through stuffing boxes in the ends of the cylinder in the ordinary manner. The plunger is bore through centrally at $k$ in the usual manner to form a cylindrical valve chamber within which fits and moves the valve L. The valve L has the usual piston portions $l, l$ at each side of its middle, and $m, m$ at or near its ends, which make a close sliding fit within this chamber. One end is prolonged and is connected to the valve rod E.

Instead of connecting the air under pressure to the middle of the cylinder, as heretofore, and thence through ports in the plunger, to communicate with the valve, the compressed air is admitted by some suitable means such as a flexible tube M, to a middle connection or nipple M' which passes freely through an opening or slot $n$ in the top of the cylinder, and screws or is otherwise united to the body of the plunger in the manner shown in Fig. 3; its central bore communicates through a duct or port $p$ with the central pressure chamber $q$, forming that part of the bore through the plunger for the valve which is between the pistons $l, l$ of the valve. The lateral valve chambers $r, r$ between the respective pistons $l, m$ thereof communicate by ports $s, s$ in the plunger with a reduced portion or annular chamber $t$ surrounding the plunger, and thence with the slot $n$ which serves as an exhaust passage, permitting the exhaust to discharge freely into the afterbody of the torpedo. The annular chamber $t$ serves as the reservoir for lubricant and may be filled with oil or hot grease by pouring through the upper opening $n$. The ports $s, s$ may lead in any direction, being shown in Fig. 3 as leading upwardly to discharge the exhaust above the lubricant in $t$. The plunger K on each side of the chamber $t$ is formed with piston portions P, P which are preferably provided with the usual piston rings, as shown. The plunger thus has only two piston portions requiring packing, as compared with three or four in depth engines as heretofore made. These packed piston portions separate the middle recess or chamber $t$ from the end chambers $u, u'$ between the ends of the plunger and the cylinder heads. For admitting compressed air into, and exhausting it from, these end chambers $u, u'$, the plunger is provided with ports $v, v'$ communicating with these chambers in the manner shown in Fig. 4; thus their inner ends normally coincide with the valve pistons $l, l$ and are covered by them in any position of rest of the valve and plunger. The nipple M' engages the parallel sides of the slot $n$ (Fig. 2) so as to prevent rotation of the plunger, and cause the ports $s$ to always discharge upwardly.

In the operation of the engine the compressed air is admitted from the tube M through the port $p$ to the central valve chamber $q$; upon any movement of the valve one of its pistons $l$ uncovers one of the ports $v$ or $v'$, thereby permitting compressed air to flow through that port into the corresponding end chamber $u$ or $u'$; thus the compressed air acts in this end chamber against that end of the plunger to force it in the contrary direction, the opposite end chamber being connected by its port (which now is uncovered by the other valve piston $l$) with the corresponding valve chamber $r$ and exhaust port $s$, so that pressure is exhausted from that chamber, thereby unbalancing the plunger and permitting it to move in the direction in which it is impelled by the pressure admitted to the first-named end chamber. This movement of the plunger continues until it brings the ports $v, v'$ into coincidence with the valve pistons $l, l$, whereby they are again closed and equilibrium of pressures is restored. Thus the plunger has followed the movement of the valve; and any other movements of the valve in either direction or to any extent are followed in like manner by equal movements of the plunger. The valve being a balanced valve, it is easily moved by the valve stem, and the air pressure (which may amount to about 400 pounds per square inch) imparts a powerful movement to the plunger, which is ample for overcoming the resistance of the depth rudder.

The new construction of depth engine has certain important advantages. In the state of equilibrium the compressed air is admitted only to the small chamber $q$ between the valve pistons $l, l$, so that leakage is limited by the close fit of these pistons, and there is no necessity of any other packing means for preventing loss of air. The plunger requires only two piston portions, P, P, each of which has the customary packing rings, instead of requiring, as heretofore, that the plunger be constructed with three (or preferably four) piston portions each with its packing rings. In the matter of lubrication the improved engine has decided advantages. There is much less blowing out of lubricating oil or grease than has existed heretofore. This is due to the fact that no packings are constantly exposed to high air pressure, as has heretofore been the case. On the contrary, it is only the packings of the piston portions P, P which are exposed to air pressure, and these receive only such reduced pressure as is admitted through the ports $v, v'$ into the chambers $u, u'$. Instead of the engine having to be opened up and re-lubricated after every practice run as heretofore, it is in proper lubricated condition for a prolonged series of practice runs. When it requires to be relubricated, it is only necessary to pour the lubricant in through the top opening $n$.

The present invention introduces also a new connection between the piston L and its operating rod E. A loose connection is necessary because one end of this rod moves in a straight line, and the other in an arc (being an arc of which the pivot $a$ is the center). Heretofore this connection has been attained by making the rod smaller than the bushing $w$ through which it emerges, and connecting it within the tubular end of the valve by a cross pin, requiring that the valve in uniting the parts be turned so that this cross pin is on an axis parallel with that of the axis $a$. The present invention substitutes a ball connection within the bore $k$ consisting of a ball $x$ formed on the end of the rod E and confined in a partial socket formed partly by the reduced and hollowed neck of the valve stem $m'$, and partly by the embracing or inwardly-flanged end of a sleeve $y$ which is slipped over such reduced neck and united thereto in any suitable way, as by a transverse pin. Thus the assembling of the parts is facilitated because the rod E may be attached in any rotary position, it being no longer necessary to provide means for indicating when it is in that position which brings the axis of its attaching pin parallel with the axis of a. It is customary to limit the end movement of the valve plunger by providing a rigid arm Q, the end of which projects between two collars R and R' on the valve rod E; and these collars have heretofore been made integrally with this rod. I now make these collars and an interposed sleeve in the form of a spool S which is united to the rod by a cross pin T. This enables the rod to be made without flanges or collars, and facilitates the construction and assembling. The operation is the same as heretofore, namely, that an extreme movement of the valve brings either collar against the arm Q and stops the valve, so that the plunger K will be stopped before it strikes either end of its cylinder.

It is convenient, but not essential, that the tubular inlet connection M' shall be united to the body of the plunger through a slot n in the cylinder. An alternative construction is shown in Fig. 7, where a tubular inlet part M'' receiving compressed air is connected directly to the tubular stem K' of the plunger outside of the stuffing box, so that air may flow through its duct p into the hollow k' of the plunger stem, and thence through a duct p' into the chamber q of the valve; the hollow k' being closed at opposite ends by plugs l', l''. In such case it will be necessary in order to balance the piston L, to provide a duct n' communicating from the valve chamber to the exterior.

The invention may be otherwise embodied, as will be apparent to those skilled in this art.

The present application is a refiling and continuation of my application Serial No. 78,825, filed January 2, 1926.

I claim as my invention:

1. An engine of the follow-up plunger type capable of use as the depth engine of an automobile torpedo, comprising a cylinder, a plunger movable therein, having a central axial bore, and as sensitively-operated balanced controlling valve movable within such bore in the plunger, said valve having piston portions and the plunger having ports communicating with its central bore, and an air pressure inlet duct connected to and moving with the plunger and admitting air pressure directly into a central pressure chamber between two opposite piston portions of the valve, whereby the air pressure in said central chamber is balanced in its effect upon the valve.

2. An engine of the follow-up plunger type capable of use as the depth engine of an automobile torpedo, comprising a cylinder, a plunger movable therein having piston portions engaging the cylinder and a chamber between said piston portions, said plunger having a central axial bore, and a sensitively-operated balanced controlling valve movable within such bore in the plunger, said valve having piston portions and the plunger having ports communicating with its central bore, and an air pressure inlet duct connected to and moving with the plunger and admitting air pressure directly into a central pressure chamber between two opposite piston portions of the valve, and the plunger formed with exhaust ports discharging through an opening in the cylinder.

3. An engine of the follow-up plunger type capable of use as the depth engine of an automobile torpedo, comprising a cylinder, a plunger movable therein having piston portions engaging the cylinder and a chamber between said piston portions, said plunger having a central axial bore, and a sensitively-operated balanced controlling valve movable within such bore in the plunger, said valve having piston portions and the plunger having ports communicating with its central bore, and an air pressure inlet duct connected to and moving with the plunger and admitting air pressure directly into a central pressure chamber between two opposite piston portions of the valve, and said air inlet duct separating the admitted pressure from the chamber between the piston portions of the plunger.

4. An engine of the follow-up plunger type comprising a cylinder, a plunger movable therein, a balanced controlling valve movable centrally within the plunger having a balanced pressure chamber, the plunger having ports controlled by the valve, and an air pressure inlet admitting air pressure immediately to said pressure chamber of the valve, said air inlet comprising a tubular part seated in the plunger and projecting out laterally through the cylinder, and the cylinder having a free lateral opening within which said tubular part may move with the plunger.

5. A depth engine having a cylinder, a plunger, and a valve formed with pistons and movable within the plunger, the plunger having a central bore for said valve and having piston portions engaging the cylinder and an annular chamber between said piston portions, the cylinder having a longitudinal slot communicating with said annular chamber, and an air pressure inlet duct comprising a nipple entering through said slot and fastened to the plunger to move therewith and engaging the slot, whereby the latter prevents rotative displacement of the plunger, said inlet duct admitting air pressure to a central chamber between two pistons of the valve, and the plunger formed with exhaust ports communicating through said annular chamber with said slot in the cylinder.

6. A depth engine comprising a horizontal cylinder, a plunger having piston portions moving in said cylinder, with an annular lubricant chamber between said piston portions, said plunger having a central bore and a balanced controlling valve formed with piston portions and movable within said bore in the plunger, the cylinder having an upper exhaust opening and the plunger having an air pressure inlet comprising a nipple passing through said opening and fastened in the plunger, said inlet communicating with the plunger bore between two piston portions of the valve, whereby the air pressure is balanced against the valve, and the plunger formed with exhaust ports leading from its bore upwardly and communicating with said exhaust opening in the cylinder, whereby exhaust may escape through said annular chamber, and the engine may be relubricated by introducing lubricant through said exhaust opening.

7. A depth engine comprising a horizontal cylinder, a plunger having piston portions moving in said cylinder, with an annular lubricant chamber between said piston portions, said plunger having a central bore and a balanced controlling valve formed with piston portions and movable within said bore in the plunger, the cylinder having an upper opening and the plunger having an air-pressure inlet communicating directly with the plunger bore between two piston portions of the valve, whereby lubricant for said plunger may be introduced into said annular chamber through said upper opening.

8. A depth engine comprising a horizontal cylinder, a plunger having piston portions moving in said cylinder with an annular chamber between said piston portions, said plunger having a central bore and a balanced controlling valve having piston portions and moving within said bore in the plunger, an air pressure inlet communicating directly with the plunger bore between two piston portions of the valve, and the plunger having exhaust passages from said bore into said annular chamber, and the cylinder having an exhaust opening communicating with said annular chamber, whereby said annular chamber between the piston portions of the plunger receives only the low pressure of the exhaust.

9. A depth engine according to claim 8, the exhaust passages in the plunger opening at the top of said annular chamber, and means for guiding the plunger to keep such passages vertical.

In witness whereof, I have hereunto signed my name.

WILLIAM DIETER.